(12) United States Patent
Singh

(10) Patent No.: US 9,275,221 B2
(45) Date of Patent: *Mar. 1, 2016

(54) CONTEXT-AWARE PERMISSION CONTROL OF HYBRID MOBILE APPLICATIONS

(71) Applicant: GLOBALFOUNDRIES INC., Grand Cayman (KY)

(72) Inventor: Kapil K. Singh, White Plains, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 181 days.

This patent is subject to a terminal disclaimer.

(21) Appl. No.: 13/875,039

(22) Filed: May 1, 2013

(65) Prior Publication Data

US 2014/0331317 A1 Nov. 6, 2014

(51) Int. Cl.
*G06F 21/52* (2013.01)
*H04L 29/06* (2006.01)
(Continued)

(52) U.S. Cl.
CPC ........ *G06F 21/52* (2013.01); *G06F 9/46* (2013.01); *G06F 21/6218* (2013.01); *G06F 21/79* (2013.01); *H04L 29/06* (2013.01); *H04L 63/10* (2013.01); *H04L 63/1425* (2013.01); *H04M 1/72522* (2013.01); *H04W 4/021* (2013.01); *G06F 15/16* (2013.01); *G06F 21/00* (2013.01);
(Continued)

(58) Field of Classification Search
CPC ........... G06F 21/52; G06F 21/79; G06F 9/00; G06F 21/6218; G06F 15/16; G06F 2221/2105; G06F 2221/2147; G06F 21/00; H04L 63/20; H04L 63/10; H04L 63/1425; H04L 63/107

USPC ....................... 726/1–4, 22–30; 709/223–226
See application file for complete search history.

(56) References Cited

U.S. PATENT DOCUMENTS

| 6,807,181 | B1  | 10/2004 | Weschler |
|-----------|-----|---------|----------|
| 7,096,491 | B2* | 8/2006  | Cheng ................... G06F 21/54 |
|           |     |         |                             705/52 |

(Continued)

FOREIGN PATENT DOCUMENTS

| WO | 2009046389 A1 | 4/2009 |
| WO | 2014178990 A1 | 11/2014 |

OTHER PUBLICATIONS

Marten J. van Sinderen et al, Supporting Context-Aware Mobile Applications: An Infrastructure Approach, IEEE, 2006.*

(Continued)

*Primary Examiner* — Shanto M Abedin
(74) *Attorney, Agent, or Firm* — Thompson Hine LLP

(57) ABSTRACT

Controlling access to secure resources of a data processing system is provided. An input-to-output mapping of an application installed on the data processing system is generated that determines whether a secure resource in the data processing system is shared with an external entity associated with the application and under what specified conditions. It is determined whether the specified conditions exist during runtime of the application. In response to determining that the specified conditions do not exist during runtime of the application, sharing of the secure resource of the data processing system with the external entity associated with the application is prevented. In response to determining that the specified conditions do exist during runtime of the application, sharing of the secure resource of the data processing system with the external entity associated with the application is allowed.

7 Claims, 9 Drawing Sheets

(51) Int. Cl.
*G06F 21/62* (2013.01)
*G06F 21/79* (2013.01)
*H04W 4/02* (2009.01)
*H04M 1/725* (2006.01)
*G06F 9/46* (2006.01)
*G06F 21/00* (2013.01)
*G06F 15/16* (2006.01)

(52) U.S. Cl.
CPC . *G06F 2221/2105* (2013.01); *G06F 2221/2147* (2013.01); *H04L 63/107* (2013.01); *H04L 63/20* (2013.01)

(56) References Cited

U.S. PATENT DOCUMENTS

| | | | |
|---|---|---|---|
| 9,087,190 | B2 | 7/2015 | Singh |
| 2005/0227678 | A1 | 10/2005 | Agrawal et al. |
| 2005/0229246 | A1 | 10/2005 | Rajagopal et al. |
| 2007/0254631 | A1* | 11/2007 | Spooner ........................ 455/411 |
| 2008/0168528 | A1* | 7/2008 | Lin et al. ........................ 726/1 |
| 2008/0256610 | A1 | 10/2008 | Patrick |
| 2009/0235334 | A1 | 9/2009 | Park |
| 2010/0122314 | A1* | 5/2010 | Zhang et al. ........................ 726/1 |
| 2011/0126282 | A1* | 5/2011 | Centonze et al. ........................ 726/21 |
| 2011/0258679 | A1* | 10/2011 | Kaplinger et al. ........................ 726/1 |
| 2012/0030289 | A1* | 2/2012 | Buford et al. ........................ 709/205 |
| 2012/0144196 | A1 | 6/2012 | Owen et al. |
| 2013/0031364 | A1* | 1/2013 | Glew ........................ G06F 21/72 713/162 |
| 2013/0179991 | A1* | 7/2013 | White et al. ........................ 726/29 |
| 2013/0275965 | A1* | 10/2013 | Dawson et al. ........................ 718/1 |
| 2013/0290709 | A1* | 10/2013 | Muppidi et al. ........................ 713/168 |
| 2014/0137181 | A1* | 5/2014 | Christodorescu et al. ........................ 726/1 |
| 2014/0189124 | A1* | 7/2014 | Banatwala et al. ........................ 709/226 |
| 2014/0331275 | A1 | 11/2014 | Singh |

OTHER PUBLICATIONS

Guangsen Zhang et al, Dynamic Context-Aware Access Control for Grid Applications, IEEE, 2003.*

Data-centric middleware for context-aware pervasive computing, Guanling Chen et al, pp. 216-253, Elsevier B. V., 2007.*
Enck, W. et al., "TaintDroid: An Information—Flow Tracking System for Realtime Privacy Monitoring on Smartphones". Proceedings of the 9th USENIX Conference on Operating Systems Design and Implementation (OSDI '10), Oct. 2010, pp. 393-407.
Hornyack et al., "'These Aren't the Droids You're Looking for': Retrofitting Android to Protect Data from Imperious Applications". Proceedings of the 18th ACM Conference on Computer and Communications Security (CCS '11), Oct. 2011, pp. 639-651.
Ongtang et al., "Semantically Rich Application—Centric Security in Android," Proceedings of the 25th Annual Computer Security Applications Conference (ACSAC '09), Dec. 2009, pp. 340-349.
Nauman et al., "Apex: Extending Android Permission Model and Enforcement with User-defined Runtime Constraints," Proceedings of the 5th ACM Symposium on Information, Computer and Communications Security (ASIACCS '10), Apr. 2010, pp. 328-332.
Adamski et al., "Trust and security in grids: A state of the art," CoreGRID—Network of Excellence, May 2008, pp. 1-33. Retrieved from <http://coregrid.ercim.eulmambo/images/storieslWhitePaperslwhp-000 1.pdf.
Ejaz, "Appaas: Provisioning of Context-aware Mobile Applications as a Service," Masters Thesis, Queen's University, Jan. 2013, pp. 1-105. Retrieved from <http://qspace.library.queensu.caljspuilbitstreaml197417799/1/Ejaz__Ali__201301__MSC.pdf>.
International Search Report dated Sep. 12, 2014, regarding application No. PCT/US2014/032765, 7 pages.
Kirkpatrick et al., "Context-Dependent Authentication and Access Control," iNetSec 2009—Open Research Problems in Network Security, Apr. 2009, 13 pages. Retrieved from <http://w3.cs.jmu.edu/kirkpams/paperslinetsec09-cdac.pdf>.
Office action dated Jan. 15, 2015, regarding U.S. Appl. No. 13/969,535, 24 pages.
Notice of Allowance dated Apr. 30, 2015, regarding U.S. Appl. No. 13/969,535, 9 pages.
International Bureau, International Preliminary Report on Patentability issued in Application No. PCT/US2014/032765, dated Nov. 12, 2015, 9 pages.

* cited by examiner

FIG. 6

EXAMPLE MANIFEST FOR A HYBRID MOBILE BANKING APPLICATION DEPLOYED ON A MOBILE IFC

```xml
<?xml version="1.0" encoding="utf-8"?>
<manifest>
    <chunk name="C1">
        <input>
            <uses-permission name="permission.CAMERA" />
            <user-data name="credentials" />
        </input>
        <output>
            <external-entity name="bank.com" />
        </output>
    </chunk>
    <chunk name="C2">
        <input>
            <uses-permission name="permission.ACCESS_COARSE_LOCATION" />
        </input>
        <output>
            <external-entity name="map.com" />
        </output>
    </chunk>
    <chunk name="C3">
        <input>
            <uses-permission name="permission.READ_CONTACTS" />
        </input>
    </chunk>
</manifest>
```

FIG. 7

EXAMPLE CONTEXT-AWARE SECURITY POLICY IN A MOBILE IFC

```xml
<?xml version="1.0" encoding="utf-8"?>
<policy>
    <condition name="worklocation">
        <type value="geolocation"></type>
            <latitude>35.769915</latitude>
            <longitude>-78.599146</longitude>
    </condition>
    <permission name="permission.CAMERA"
        condition="worklocation" condition-match="deny" />
</policy>
```

CONTEXT-AWARE PERMISSION CONTROL OF HYBRID MOBILE APPLICATIONS

BACKGROUND

1. Field

The disclosure relates generally to hybrid mobile applications and more specifically to controlling access to secure resources of a mobile device by hybrid mobile applications running on the mobile device based on user-defined, context-aware security policies.

2. Description of the Related Art

With the development of new mobile operating system platforms, mobile computing has grown in popularity exponentially in recent years. A major factor driving this exponential growth is the availability of a large number of mobile applications that provide functionality ranging from banking to gaming to social networking. To benefit from the constantly growing consumer market for these mobile applications, enterprises are producing new mobile applications that are built from the composition of existing ones at breakneck speed.

SUMMARY

According to one illustrative embodiment, a method for controlling access to secure resources of a data processing system is provided. A data processing system generates an input-to-output mapping of an application installed on the data processing system that determines whether a secure resource in the data processing system is shared with an external entity associated with the application and under what specified conditions. The data processing system determines whether the specified conditions exist during runtime of the application. In response to the data processing system determining that the specified conditions do not exist during runtime of the application, the data processing system prevents sharing of the secure resource of the data processing system with the external entity associated with the application. In response to the data processing system determining that the specified conditions do exist during runtime of the application, the data processing system allows sharing of the secure resource of the data processing system with the external entity associated with the application.

According to other illustrative embodiments, a data processing system and a computer program product for controlling access to secure resources of the data processing system are provided.

BRIEF DESCRIPTION OF THE SEVERAL VIEWS OF THE DRAWINGS

FIG. 6 is an illustration of a specific example of a manifest for a hybrid mobile banking application deployed on a mobile information flow control module in a mobile device in accordance with an illustrative embodiment;

FIG. 7 is an illustration of a specific example of a user-defined, context-aware policy within a mobile information control module in a mobile device in accordance with an illustrative embodiment;

DETAILED DESCRIPTION

Figure 1:
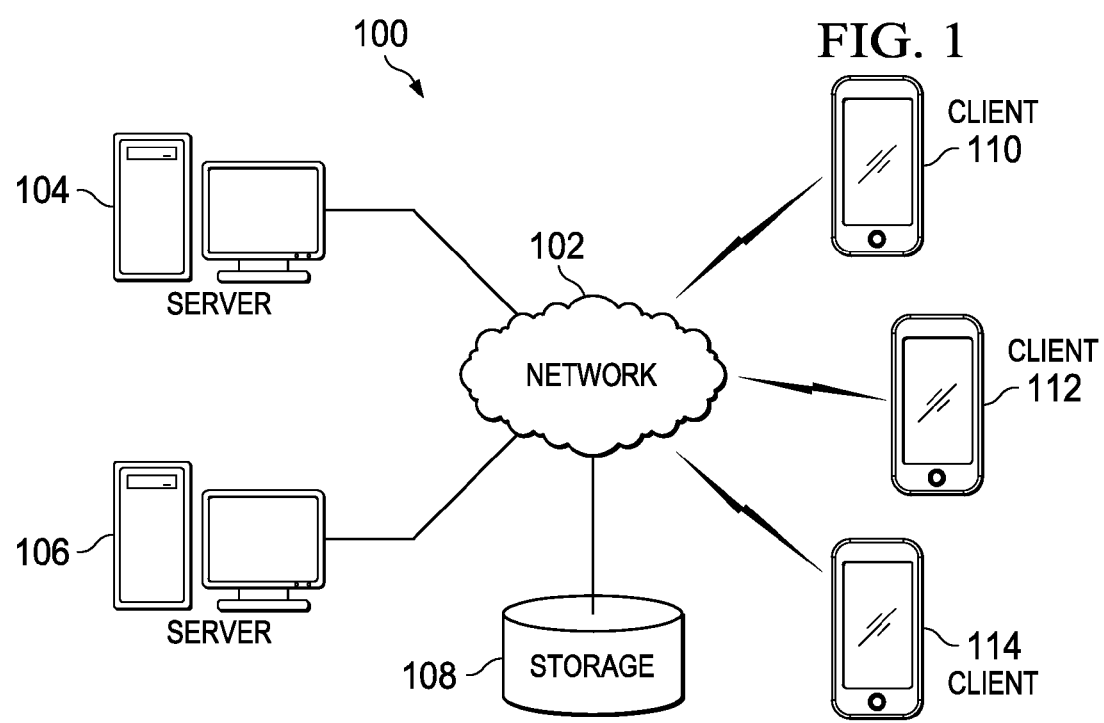
FIG. 1 is a pictorial representation of a network of data processing systems in which illustrative embodiments may be implemented.

As will be appreciated by one skilled in the art, aspects of the illustrative embodiments may be embodied as a data processing system, method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, data processing systems, and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
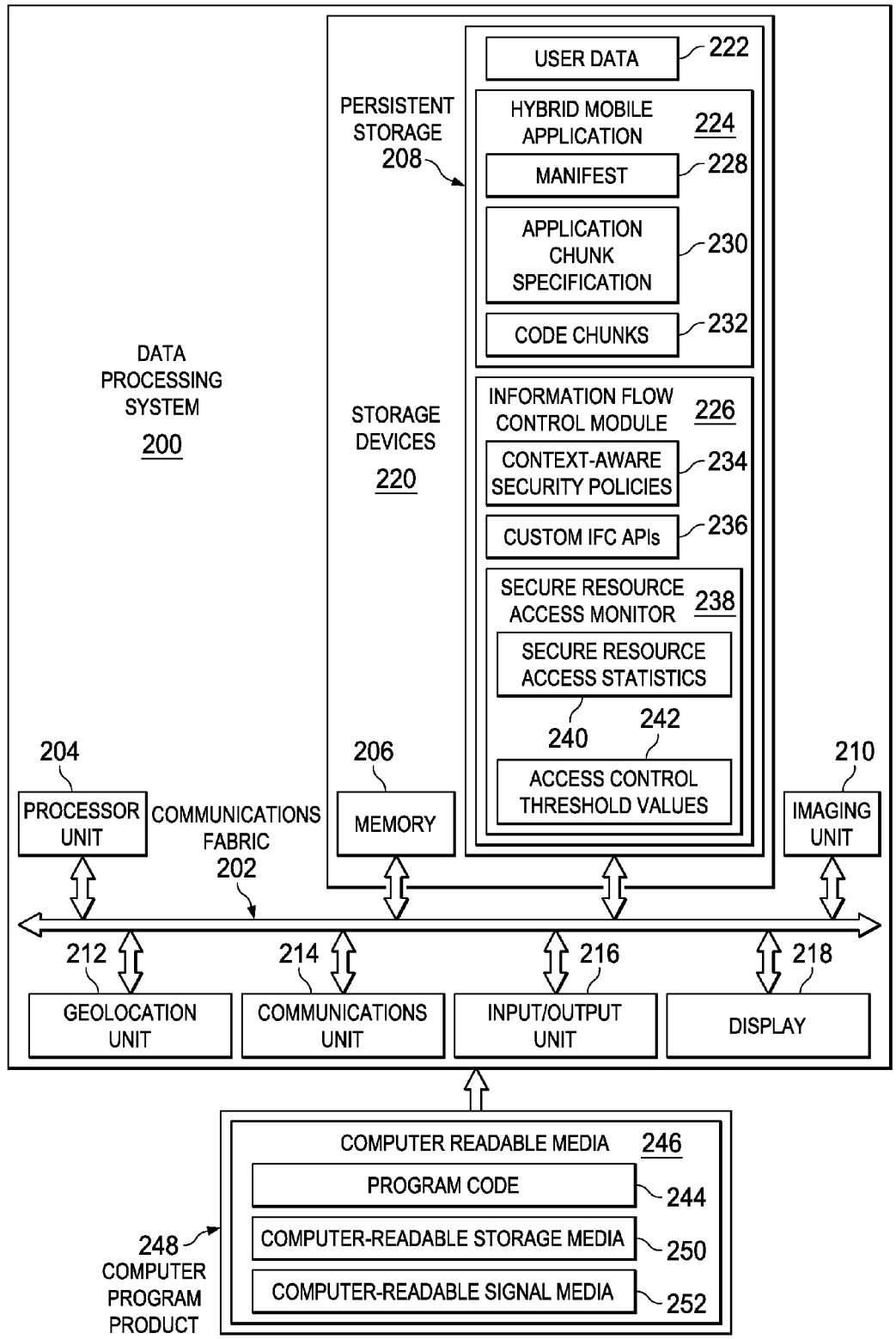
FIG. 2 is a diagram of a data processing system in which illustrative embodiments may be implemented.
Figure 3:
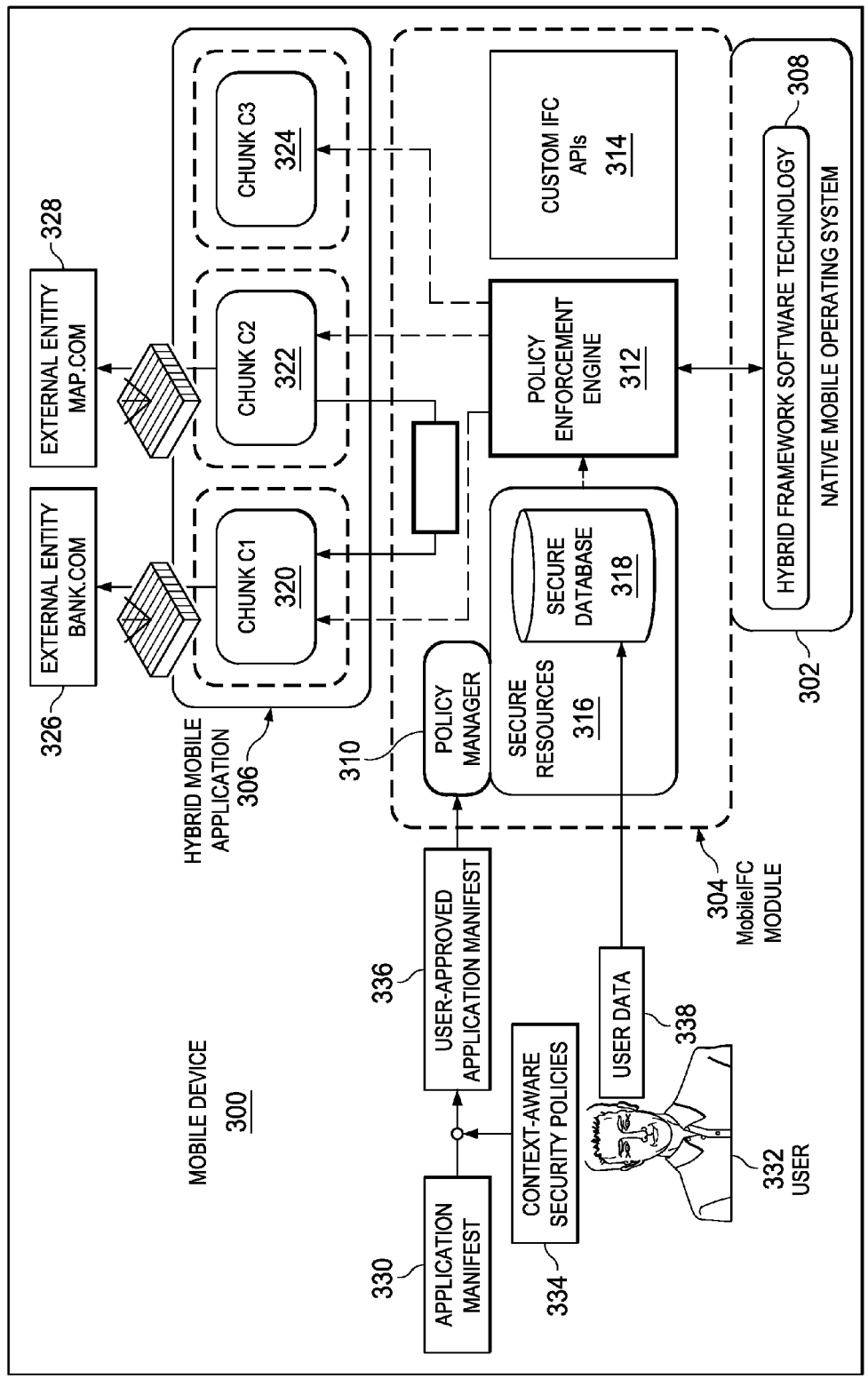
FIG. 3 is a diagram of a mobile device in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide one or more services to applications located on client devices connected to network 102. For example, server 104 may provide banking services to associated banking applications running on the client devices. Also, server 106 may provide, for example, a map service to the client devices.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 utilize clients 110, 112, and 114 to access the services provided by server 104 and/or server 106.

Clients 110, 112, and 114 may be, for example, mobile data processing systems, such as cellular telephones, smart phones, personal digital assistants, gaming devices, or handheld computers, with wireless communication links to network 102. In addition, clients 110, 112, and 114 may be personal computers, network computers, and/or portable computers, such as laptop computers, with wire and/or wireless communication links to network 102. It should be noted that clients 110, 112, and 114 may represent any combination of computers and mobile data processing systems connected to network 102.

Storage 108 is a network storage device capable of storing data in a structured or unstructured format. Storage 108 may provide, for example, storage of: names and identification numbers of a plurality of users; account information associated with each of the plurality of users; applications installed on data processing systems associated with each of the plurality of users; and user history data for each of the plurality of users that may include services accessed by each of the plurality of users. Storage 108 also may store a plurality of different types of applications used to access a plurality of different types of network services. Furthermore, storage unit 108 may store other data, such as authentication or credential data that may include user names, passwords, and/or biometric data associated with each of the plurality of users.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a mobile data processing device, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, imaging unit 210, geolocation unit 212, communications unit 214, input/output (I/O) unit 216, and display 218.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 220. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores user data 222, hybrid mobile application 224, and information flow control (IFC) module 226. However, it should be noted that persistent storage 208 may store any type of application, module, and data utilized by the different illustrative embodiments. User data 222 may be any data, such as, for example, one or more lists of personal contacts and email addresses input by a user of data processing system 200 that the user wants to keep as private or secure data.

Hybrid mobile application 224 is a software application developed to access one or more network services by data processing system 200 and consume user data 222 to perform their functionality. For example, hybrid mobile application 224 may be a hybrid mobile banking application developed to access banking services provided by a network banking server device, such as server 104 in FIG. 1, which is associated with hybrid mobile application 224. Hybrid mobile application 224 may further access a geolocation of data processing system 200 to show a map of the location provided by a network map service server device, such as server 106 in FIG. 1, which also is associated with hybrid mobile application 224. Hybrid mobile application 224 is a software application that was developed as a web application (i.e., developed using web technologies), but is hosted on data processing system 200 as a native application. A web application is a software application coded in a browser-supported programming language, such as JavaScript®. JavaScript is a trademark of the Oracle Corporation. A native application is a software application developed for a particular mobile data processing device. In other words, hybrid mobile application 224 combines benefits of web and native applications.

In this example, hybrid mobile application 224 includes manifest 228, application chunk specification 230, and code chunks 232. Manifest 228 lists the data permission and access requirements of hybrid mobile application 224. A developer of hybrid mobile application 224 creates and defines application chunk specification 230. Application chunk specification 230 is a specification that lists a set of one or more code chunks within hybrid mobile application 224. A code chunk is the smallest segment of code on which a security policy may be administered. The developer defines a code chunk based on what information or data the code chunk has access to within data processing system 200 and what external entity the code chunk is permitted to communicate with.

Application chunk specification 230 lists all external communications of code chunks 232 within hybrid mobile application 224 and the secure resources of data processing system 200 shared with the external entities. A secure resource of data processing system 200 may be, for example, user data 222, image data generated by imaging unit 210, geolocation data generated by geolocation unit 212, and/or a number of network connections established by communications unit 214.

An external entity may be, for example, a network server, such as server 106 in FIG. 1, which provides a service to hybrid mobile application 224 installed on data processing system 200. For example, a hybrid mobile social networking application installed on data processing system 200 may communicate with a network server associated with news.com to receive a news feed for the user of data processing system 200. Each code chunk in code chunks 232 contains a safe object or a safe subset of JavaScript that has direct application programming interface (API) calls to the secure resources of data processing system removed. In other words, each code chunk cannot directly access a secure resource of data processing system 200, but instead must utilize a custom information flow control application programming interface included within information flow control module 226.

Information flow control module 226 is a software program that controls the access to the secure resources of data processing system 200 by all hybrid mobile applications running on data processing system 200. In this example, information flow control module 226 includes context-aware security policies 234, custom information flow control application programming interfaces 236, and secure resource access monitor 238. Context-aware security policies 234 are a set of security policies that define permissions granted to external entities to access the secure resources of data processing system 200.

A user of data processing system 200 defines context-aware security policies 234 and grants the permissions to access the secure resources of data processing system 200 by the external entities. The permissions grant access to share the secure resources with the external entities based on a context or a set of specified conditions that may exist during run time of any of the hybrid mobile applications installed on data processing system 200. The specified conditions may be, for example, at least one of a current geographic location of the data processing system, an identity of the external entity associated with hybrid mobile application 224, and an access control threshold value associated with the secure resource. As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination of items and number of items may be used from the list but not all of the items in the list are required.

Information flow control module 226 requires that only custom information flow control application programming interfaces 236 are to be used to call the secure resources of data processing system 200. Custom information flow control application programming interfaces 236 prevent malicious or accidental damage or intrusion to the secure resources of data processing system 200. Thus, information flow control module 226 controls and protects the sharing of a set of one or more secure resources of data processing system 200 with a set of one or more external entities associated with hybrid mobile application 224. Secure resource access monitor 238 monitors and tracks secure resource access statistics 240. Secure resource access statistics 240 list the number of accesses to each secure resource in data processing system 200 by each external entity.

Access control threshold values 242 list a maximum number of accesses to each secure resource of data processing system 200 by an external entity, possibly, within a particular timeframe. The user of data processing system 200 defines access control threshold values 242. Information flow control module 226 utilizes access control threshold values 242 to limit the number of accesses to a secure resource in data processing system 200 by a particular external entity.

Imaging unit 210 may be, for example, a camera embedded in or coupled to data processing system 200. Imaging unit 210 is capable of taking still photographs and/or video clips. Geolocation unit 212 may be, for example, a global positioning system (GPS) transceiver unit. Geolocation unit 212 is capable of determining a current geographic position of data processing system 200.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may provide touch screen capabilities.

Instructions for the operating system, applications, and/or programs may be located in storage devices 220, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a server data processing system may be downloaded over a network from the server to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that most mobile operating systems use a capability-based permission model that mediates applications' access to secure mobile device resources, such as image data generated by a camera of the mobile device or contact list data input by a user of the mobile device. Mobile operating systems vary in the way permissions are granted to the secure resources. For example, in one mobile operating system type users approve the permissions granted to an application at install time, whereas in another operating system type such user approval of permissions granted to an application is performed when the application is first used.

The capability-based permission model is coarse-grained and lacks flexibility to support rich security policies. For example, the capability-based permission model does not allow conditional policies, such as location-based policies, to control permissions. Moreover, the granted permissions cannot be modified at runtime of an application and require a reinstallation of the application to include any changes to the granted permissions. In addition, the capability-based permission model only provides access control over the secure mobile device resources by explicitly releasing corresponding capabilities to the applications. However, static access control policies are not sufficient to enforce the privacy of a user. For example, once an application is granted access to secure data, the application is free to leak this secure data at anytime to a malicious external entity. Further no provision exits to grant or revoke permissions based on the context of the hybrid mobile application or the mobile device. For example, permissions cannot be customized to limit an application's access to the mobile device's camera based on the location of the mobile device.

Illustrative embodiments protect the secure resources of the mobile device from leaks by untrusted (i.e., malicious or vulnerable) hybrid mobile applications. Illustrative embodiments protect the secure resources of a mobile device by utilizing a mobile information flow control (IFC) module that leverages the mediation layer of the hybrid platform to support runtime enforcement of context-aware security policies associated with hybrid mobile applications. The mobile information flow control module allows the user to define the context-aware security policies for protection of the secure resources of the mobile device, while at the same time enabling hybrid mobile applications to be more specific about their permission requirements. For example, the user may specify context-based security policies, such as "camera pictures taken while the mobile device is located at a specified work location should only be shared with a company's server." In addition, the hybrid mobile applications also may specify a finer-grained permission requirement, such as "camera pictures are only shared with a specified photo editing software program."

For supporting fine grain security policy enforcement, the mobile information flow control module of illustrative embodiments provides tracking of information flow of the hybrid mobile applications. The mobile information flow control module redesigns the untrusted hybrid mobile applications in such a way that the untrusted hybrid mobile applications have access to any secure data requested by the untrusted hybrid mobile applications by utilizing user-granted permissions, thus allowing the untrusted hybrid mobile applications to perform their functionality and at the same time, not allowing the untrusted hybrid mobile applications to pass the secure data to an unauthorized external entity. The mobile information flow control module achieves this by splitting the untrusted hybrid mobile applications into chunks of code along security relevant boundaries and mapping user-granted permissions to each of the individual code chunks. This code chunk design forces the untrusted hybrid mobile applications into making any secure data sharing with external entities explicit to user-granted permissions. In addition, this code chunk design only allows communications with external entities that satisfy user-defined, context-aware policies or communications that are explicitly granted by the user.

To enable the context-aware security policies, the mobile information flow control module determines the context of the mobile device and/or the hybrid mobile application at runtime when secure resource access is requested by the hybrid mobile application. The mobile information flow control module grants permission to share a secure resource with an external entity based on the determined context. For location-based security policies as an example, the mobile information flow control module utilizes a custom information flow control geolocation application programming interface of the hybrid platform to determine the current geographic location of the mobile device before retrieving the associated context-aware security policies. By utilizing custom information flow control application programming interfaces, illustrative embodiments do not require modification of the underlying native mobile operating system.

Thus, the mobile information flow control module prevents hybrid mobile applications from leaking secure data on a mobile device. The mobile information flow control module prevents secure data leaks by mediating all communication to and from the hybrid mobile applications at runtime enabling users to administer context-aware security policies that satisfy the privacy requirements of the users. Typically, hybrid mobile applications utilize services provided by network servers. As a result, the hybrid mobile applications need to communicate with external entities to perform specific tasks. For example, a hybrid mobile social networking application may seek to utilize a camera application located on a mobile device to take and post a picture of a user of the mobile device to the user's profile on a social networking web site.

When a particular hybrid mobile application is installed on a mobile device, the information flow control module presents the user with a manifest that lists what secure resources are needed by the hybrid mobile application and which external entities the secure resources will be shared with. For example, the social networking application's manifest would specify that the social networking application will share pictures taken by the mobile device's camera with the social network's server only. In addition to the approval-based approach, the information flow control module also allows the user to define security policies as functions of secure resources (as input), external entities (as output), and mobile device or mobile application context (as an associated condition). For example, the user may specify that the mobile device's camera should not be available to any mobile application at work, thus revoking social networking application's camera access at user's work location.

It should be noted that all external entities are untrusted by default unless the external entities are approved by the user of the mobile device for secure resource sharing. Once approved, an external entity is considered semi-trusted (i.e., the external entity may only receive the secure data for which the external entity was granted permission by the user). Thus, illustrative embodiments provide a method, data processing system, and computer program product for controlling access to secure resources of the data processing system.

With reference now to FIG. 3, a diagram of a mobile device is depicted in accordance with an illustrative embodiment. Mobile device 300 may be implemented in, for example, data processing system 200 in FIG. 2. Also, mobile device 300 may be a smart phone, for example.

In this example, mobile device 300 includes native mobile operating system (OS) 302, mobile information flow control (IFC) module 304, and hybrid mobile application 306. Native mobile operating system 302 is a mobile operating system that is native to mobile device 300. Native mobile operating system 302 may represent any type of mobile operating system that may run on mobile device 300. In addition, hybrid framework software technology 308 runs on top of native operating system 302. Hybrid framework software technology 308 represents a set of software programs that supports the execution of hybrid mobile applications installed on mobile device 300.

Mobile information flow control module 304 may be, for example, information flow control module 226 in FIG. 2. Mobile information flow control module 304 controls the flow of information in and out of all hybrid mobile applications, such as hybrid mobile application 306, running on mobile device 300. More specifically, mobile information flow control module 304 controls the flow of information in and out of a set of code chunks within each of the running hybrid mobile applications. For example, mobile information flow control module 304 controls the flow of information through chunk 320 C1, chunk 322 C2, and chunk 324 C3 within hybrid mobile application 306. Code chunks 320-324 within hybrid mobile application 306 may be, for example, code chunks 232 within hybrid mobile application 224 in FIG. 2.

In this example, mobile information flow control module 304 includes policy manager 310, policy enforcement engine 312, and custom information flow control application programming interfaces 314. Policy manager 310 receives from user 332 context-aware security policies 334. User 332 also approves application manifest 336 that is associated with hybrid mobile application 306 before application 306 is installed on user 332's mobile device 300. In addition, policy manager 310 may verify that user-approved application manifest 336 complies with context-aware security policies 334. Context-aware security policies 334 may be, for example, context-aware security policies 234 in FIG. 2. Context-aware security policies 334 are a set of security policies that define permissions granted by user 332 to external entity 326 bank.com and external entity 328 map.com to access secure resources 316 of mobile device 300. User-approved application manifest 336 is all or a portion of application manifest 330 that user 332 selected as being authorized for external entity communication. Application manifest 330 is a manifest file associated with hybrid mobile application 306 and may be, for example, manifest 228 in FIG. 2.

Policy manager 310 may display a notification to user 332 for resolution of any selection in user-approved application manifest 336 that is non-compliant with context-aware security policies 334. Afterward, policy manager 310 forwards context-aware security policies 334 and user-approved application manifest 336 to policy enforcement engine 312. Policy enforcement engine 312 utilizes context-aware security policies 334 and user-approved application manifest 336 to enforce information flow control through chunk 320 C1, chunk 322 C2, and chunk 324 C3 within hybrid mobile application 306. In other words, policy enforcement engine 312 utilizes context-aware security policies 334 and user-approved application manifest 336 to grant permission to particular code chunks within hybrid mobile application 306 to share a set of one or more particular secure resources within mobile device 300 with a particular external entity.

Secure resources 316 may include user data 338 input by user 332 and stored in secure database (DB) 318. User data 338 may be, for example, user data 222 in FIG. 2. In addition, secure resources 316 also may include, for example, image data, such as still photographs or video clips, generated by a camera in mobile device 300 or geolocation data, such as GPS coordinates, generated by a geolocation unit in mobile device 300. The camera and the geolocation unit may be, for example, imaging unit 210 and geolocation unit 212 in FIG. 2. Further, secure resources 316 also may include a network communications unit in mobile device 300, such as communications unit 214 in FIG. 2, and a number of network connections established by the network communications unit.

During deployment of hybrid mobile application 306 on mobile device 300, mobile information flow control module 304 removes all direct application programming interface calls to secure resources 316 on mobile device 300. Thus, mobile information flow control module 304 modifies hybrid mobile application 306 to exclude any direct application programming interface calls that provide a direct handle to access secure resources 316 and to invoke the functionality of secure resources 316. As a result, mobile information flow control module 304 requires hybrid mobile application 306 to utilize custom information flow control application programming interfaces 314 of mobile information flow control module 304 to call one or more of secure resources 316 to be shared with external entity 326 and/or external entity 328. Custom information flow control application programming interfaces 314 may be made available as, for example, an add on library and packaged into mobile information flow control module 304 to be made available to hybrid mobile application 306 code at runtime. Using custom information flow control application programming interfaces 314 as an add-on library minimizes the complexity of code changes a developer is required to make to hybrid mobile application 306. Also, custom information flow control application programming interfaces 314 support unidirectional and bidirectional communication between chunk 320 C1, chunk 322 C2, and chunk 324 C3 within hybrid mobile application 306.

In the example of FIG. 3, hybrid mobile application 306 represents a hybrid mobile banking application to show how context-aware security policies may be defined and enforced in mobile information flow control module 304 to prevent hybrid mobile application 306 from leaking secure user data 338. Context-aware security policies 334 are expressed via user-granted permissions, along with other security policies, such as enterprise-based security policies, which are enforced at runtime of hybrid mobile application 306 by mobile information flow control module 304.

It should be noted that while context-aware security policies 334 may allow user 332 of mobile device 300 to enforce privacy requirements of user 332 and potentially prevent malicious behavior of hybrid mobile application 306, illustrative embodiments anticipate that tradeoffs may arise, such as, for example, certain security policy requirements may prevent malicious behavior by hybrid mobile application 306, but also may disrupt the functionality of non-malicious behavior of other hybrid mobile applications running on mobile device 300. Consequently, user 332 must make security policy decisions based on the specific privacy requirements of user 332 and/or the security restrictions imposed by an enterprise associated with user 332.

User-approved application manifest 336 provides finer-grained, user-granted permissions for external entity communication. Specifically, user-approved application manifest 336 provides an input-to-output mapping that represents what set of secure resources 316 is to be shared with which external entity. Using the hybrid mobile banking application example, this input-to-output mapping would correspond to mapping login credential data of user 332 to external entity 326 bank.com and mapping geolocation data of mobile device 300 to external entity 328 map.com.

Context-aware security policies 334 may address conditional use of secure resources 316 by the hybrid mobile banking application. The conditional use may be a derivative of the state of mobile device 300, such as, for example, the current GPS coordinates of mobile device 300 or the time of day. As an example of a situation where granted permissions depend on context, consider a scenario where a governmental agency, such as the Department of Defense, wants to impose a conditional requirement of "No images are to be captured at the Pentagon." This conditional requirement maps to the context-aware security policy: If the current geographic location of mobile device 300 corresponds to the Pentagon's location coordinates, then a hybrid mobile application's camera capture capability is disabled. This is an example of a negative context-aware condition (i.e., do not allow access to the secure resource (e.g., camera capture capability) of mobile device 300 when the condition exists). However, it should be noted that illustrative embodiments also utilize positive context-aware conditions (i.e., allow access to the secure resource of mobile device 300 when the condition exists). For example, if the current geographic location of mobile device 300 corresponds to the GPS coordinates of a company that employs the user of mobile device 300, then a hybrid mobile application's functionality associated with the company may be enabled for access and use by the user.

Mobile information flow control module 304 ensures that the camera is only activated when the current geolocation of mobile device 300 is in a certain state. To address such a scenario, mobile information flow control module 304 restricts the hybrid mobile application to access the camera of mobile device 300 only through custom information flow control application programming interfaces 314. Mobile information flow control module 304 utilizes custom information flow control application programming interfaces 314 to resolve the required context to determine the current geographic location of mobile device 300 and to ensure that the camera is only activated in accordance with the appropriate context-aware security policy.

Further, mobile information flow control module 304 may utilize usage-based security policies to prevent or limit any malicious damage by a hybrid mobile application by limiting the usage of or access to secure resources 316. One example of a usage-based security policy may be that a hybrid mobile application is not granted permission to send more than one hundred short message service (SMS) messages per day. Another example may be that a hybrid mobile application is not granted permission to establish more than five network connections at the same time.

In other words, the usage-based requirements for various secure resources, which a hybrid mobile application is requesting, must be explicitly specified in security policies. If the requested number is more than a maximum number specified by the security policies, user 332 would have to explicitly provide such an exception. User 332 may rely on a number of factors to make such an exception decision, such as the reputation of the external entities to which network connections are being made, the previous track record of the developer of the hybrid mobile application, et cetera. As a result, context-aware security policies 334 ensure that the permissions are fail-safe, where the minimum permissions are initially provided and all exceptions to these permissions are explicitly approved by user 332.

For usage-based security policies, mobile information flow control module 304 utilizes a monitor, such as secure resource access monitor 238 in FIG. 2, to keep statistics on access to or usage of secure resources 316, such as the number of network connections made by a network communications device in mobile device 300, and to prevent access to or usage of secure resources 316 once a pre-defined access control threshold value, such as access control threshold values 242 in FIG. 2, is reached or exceeded. For context-aware security policies 334, mobile information flow control module 304 analyzes the input data security policy to resolve any unknown contexts before verifying the contexts against a specified condition in a particular context-aware security policy. For conditional location-based security policies as an example, mobile information flow control module 304 determines a current geographic location of mobile device 300 before checking the associated specified condition. It should be noted that mobile information flow control module 304 runs within the trust domain of mobile device 300, so mobile information flow control module 304 is privileged with all the necessary permissions to determine contexts by utilizing the sensors of mobile device 300.

Code chunks 320-324 of hybrid mobile application 306 encapsulate different levels of private information associated with user 332. Therefore, mobile information flow control module 304 isolates code chunks 320-324 from each other in order to prevent private information leaks. In addition, mobile information flow control module 304 maintains a mapping between permissions and the corresponding custom information flow control application programming interfaces that require these permissions.

Figure 4:
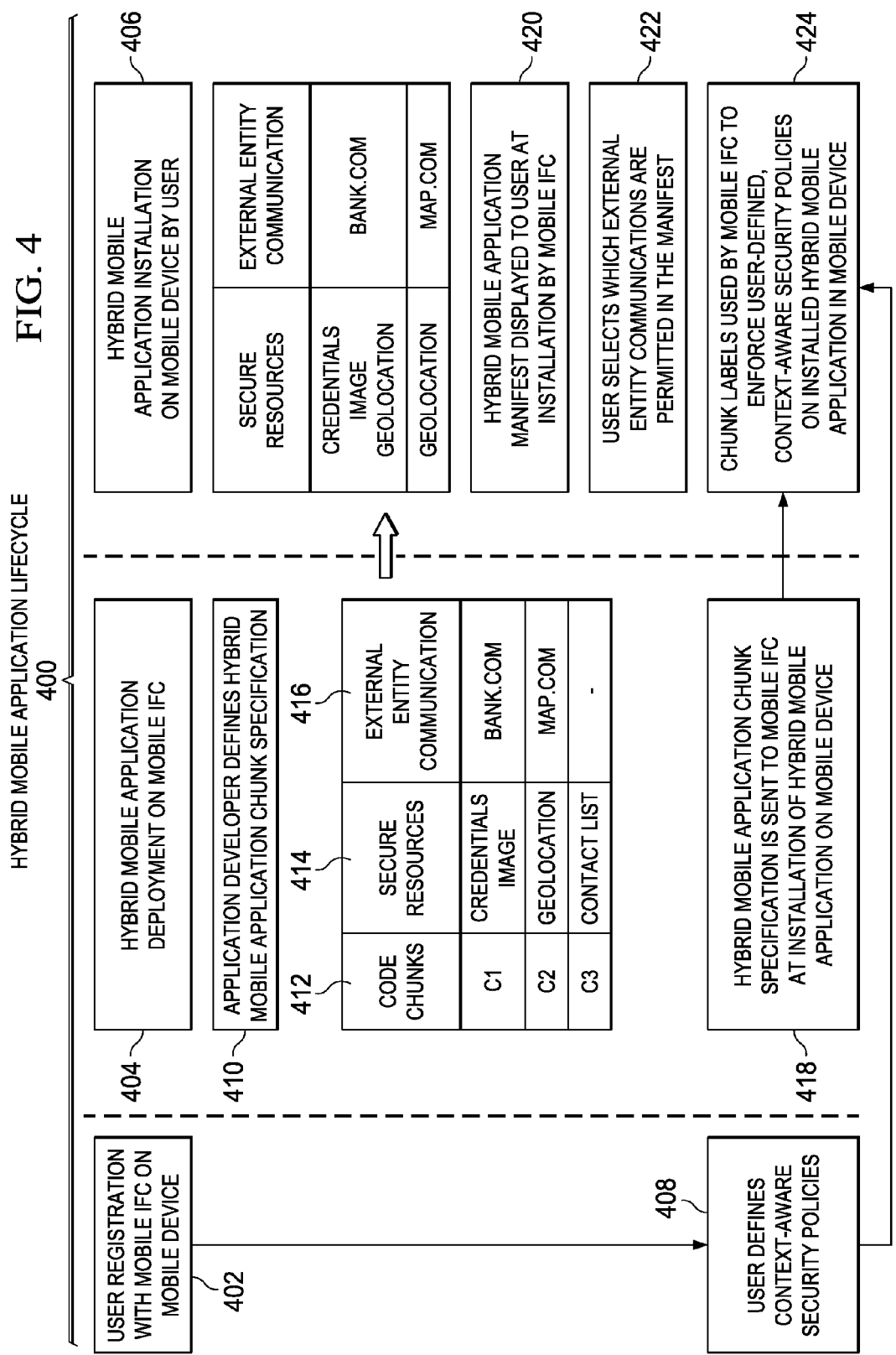
FIG. 4 is a diagram illustrating a lifecycle of a hybrid mobile application in accordance with an illustrative embodiment.

With reference now to FIG. 4, a diagram illustrating a lifecycle of a hybrid mobile application is depicted in accordance with an illustrative embodiment. Hybrid mobile application lifecycle 400 represents an example of a typical lifecycle of a hybrid mobile application, such as hybrid mobile application 306 in FIG. 3, in accordance with illustrative embodiments. Hybrid mobile application lifecycle 400 includes user registration with mobile information flow controller on mobile device 402, hybrid mobile application deployment on mobile information flow controller 404, and hybrid mobile application installation on mobile device by user 406.

The user performs user registration with a mobile information flow controller on a mobile device at 402. During user registration at 402, the user defines context-aware security policies at 408. For example, user 332 defines context-aware security policies 334 and registers context-aware security policies 334 with policy manager 310 within mobile information flow control module 304 in FIG. 3. When the user defines context-aware security policies 408, the user may specify, for example, that the contact list of the user should never be shared with any external entity.

At hybrid mobile application deployment 404, the application developer defines a hybrid mobile application chunk specification at 410, such as application chunk specification 230 in FIG. 2. The hybrid mobile application chunk specification includes a listing of code chunks 412 with associated secure resources 414 and external entity communication 416. In this example, code chunks 412 includes code chunks C1, C2, and C3, such as chunk 320 C1, chunk 322 C2, and chunk 324 C3 in FIG. 3. Secure resources 414 include: login credential data input by a user of a mobile device and image data generated by an imaging unit in the mobile device, which are associated with code chunk C1; geolocation data generated by a geolocation unit in the mobile device, which is associated with code chunk C2; and contact list data input by the user, which is associated with code chunk C3. External entity communication 416 lists which external entities are granted permission to share one or more of secure resources 414. External entity communication 416 includes bank.com, which is associated with code chunk C1 that is granted permission to share the login credential data and the image data with bank.com. External entity communication 416 also includes map.com, which is associated with code chunk C2 that is granted permission to share the geolocation data with map.com. Code chunk C3 is not granted permission to share the contact list data with any external entity. The hybrid mobile application chunk specification is sent to the mobile information flow control module at installation of the hybrid mobile application on the mobile device at 418. The mobile information flow control module utilizes the information within the chunk specification to generate a manifest file, such as manifest 228 in FIG. 2, for the hybrid mobile application.

At hybrid mobile application installation 406, a hybrid mobile application manifest is displayed to the user at installation by the mobile information flow control module at 420. As illustrated in this example, the manifest is basically a specification of the hybrid mobile application's external entity communications, irrespective of the code chunks, along with the secure resources that are shared during each external entity communication. The user of the mobile device approves the manifest, such as user-approved application manifest 336 in FIG. 3, prior to installation of the hybrid mobile application on the mobile device. The user selects which external entity communications are permitted in the manifest at 422.

Additionally, the mobile information flow control module ensures that all of the code chunks within the hybrid mobile application comply with the user-defined, context-aware security policies and the manifest approved by the user. For any context-aware security policies, the mobile information flow control module determines the context at runtime and verifies specified conditions associated with the context-aware security policies before granting any access to a set of secure resources on the mobile device. Chunk labels are used by the mobile information flow control module to enforce the user-defined, context-aware security policies on the installed hybrid mobile application in the mobile device at 424.

Figure 5:
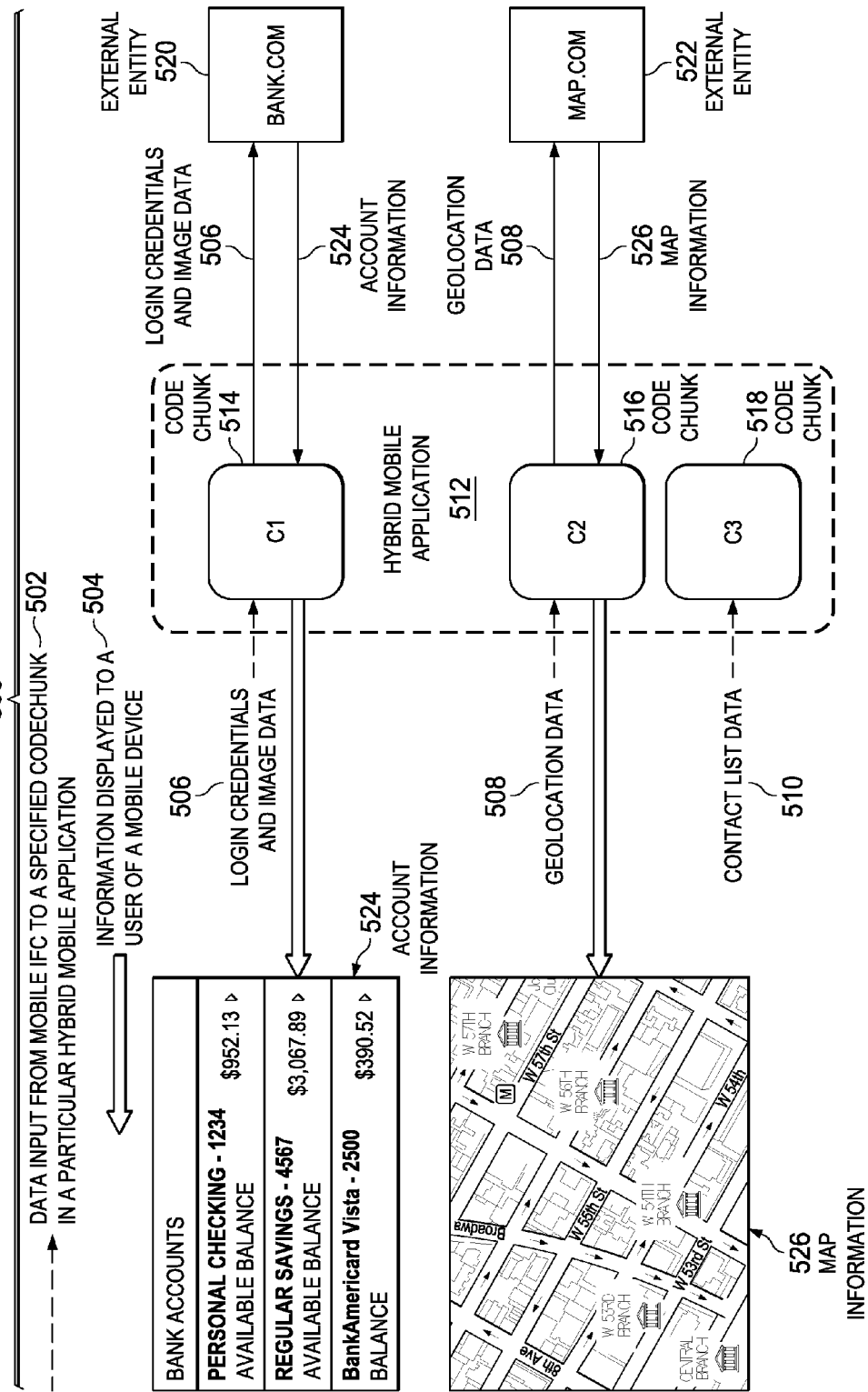
FIG. 5 is a diagram illustrating an example of controlling the flow of information used by a hybrid application in accordance with an illustrative embodiment.

With reference now to FIG. 5, a diagram illustrating an example of controlling the flow of information used by a hybrid application is depicted in accordance with an illustrative embodiment. Controlled information flow 500 represents the flow of data and information through a hybrid mobile application running on a mobile device, such as mobile device 300 in FIG. 3.

Data input from mobile information flow controller to a specified code chunk in a particular hybrid mobile application 502 represents the flow of data into code chunks 514-518 of hybrid mobile application 512. Information displayed to a user of a mobile device 504 represents the flow of information received by code chunks 514-518 from external entities 520-522 that is to be displayed on a display of the mobile device.

To satisfy the user's privacy requirements using the hybrid mobile banking application example from above, two conditions should be met: (1) no bank account information is to be shared with map.com; and (2) the contact list data is to be kept private (i.e., not shared with any external entity). Splitting hybrid mobile application 512 into multiple code chunks, such as code chunk 514 C1, code chunk 516 C2, and code chunk 518 C3, allows the application developer to segment functionality within hybrid mobile application 512 that relies on different secure resources within the mobile device. A mobile information flow control module, such as mobile information flow control module 304 in FIG. 3, in the mobile device splits hybrid mobile application 512 into three code chunks, for example, based on at least one of a chunk specification of hybrid mobile application 512 created by the developer and a set of context-aware security policies associated with hybrid mobile application 512 created by the user. Splitting hybrid mobile application 512 into different code chunks exposes the security-relevant information flows within hybrid mobile application 512. A code chunk represents a segment of code that is uniquely identified by the input data into a particular code chunk and the external entities the particular code chunk needs to communicate with. For example, code chunk 516 C2 takes in geolocation data 508 as the input data and communicates geolocation data 508 to external entity 522 map.com.

In this example, code chunk 514 C1 only communicates with external entity 520 bank.com and accesses login credentials and image data 506. The login credential data may be, for example, a user identification and password. External entity 520 bank.com verifies the login credentials prior to sending any information to the mobile device. The image data may be, for example, an image of a check generated by a camera of the mobile device. After receiving login credentials and image data 506, external entity 520 bank.com sends account information 524 to code chunk 514 C1. Account information 524 may be, for example, bank account balances associated with the user.

Code chunk 516 C2 has no access to any bank associated data, but shares with external entity 522 map.com geolocation data 508. Geolocation data 508 is the current geographic location of the mobile device generated by a geolocation unit located in the mobile device. Using geolocation data 508, external entity 522 map.com sends map information 526 to code chunk 516 C2. Map information 526 may be, for example, bank locations nearest to the current geographic position of the mobile device.

Hybrid mobile application 512 also may want to access contact list data 510 (i.e., a secure resource) of the user of the mobile device to facilitate selection of recipients for person-to-person payments. However, in this example contact list data 510 is not shared with any external entity. In other words, code chunk 518 C3 has access to contact list data 510, but the user of the mobile device has not granted code chunk 518 C3 permission to communicate or share the contact list with any external entity.

Because code chunk 516 C2 is only granted access to geolocation data 508, this is the only data code chunk 516 C2 may communicate to an external entity, such as external entity 522 map.com. Moreover, code chunk 516 C2 is restricted to communicating only with external entity 522 map.com. It should be noted that data and information may flow from a less restricted code chunk to a more restricted code chunk, thereby allowing one-way communication between code chunks. For example, code chunk 516 C2 may pass to code chunk 514 C1 the user's selection of a bank branch location on map information 526. Code chunk 514 C1 may then use the selection of the bank branch location to show information associated with that bank branch. Because code chunk 518 C3 cannot communicate with any external entity, code chunk 518 C3 cannot leak any secure data outside the mobile device. This external entity communication restriction enables code chunk 518 C3 to receive any secure data from other code chunks, as well as any other secure user data in addition to contact list data 510.

Also, it should be noted that the user of the mobile device can decide not to share geolocation data 508 with external entity 522 map.com by not selecting that portion of the manifest associated with that particular external entity communication. Not selecting that particular external entity communication to share geolocation data 508 would not impact the core banking functionality of hybrid mobile application 512 and may only partially impact the overall experience of the user.

With reference now to FIG. 6, an illustration of a specific example of a manifest for a hybrid mobile banking application deployed on a mobile information flow control module in a mobile device is depicted in accordance with an illustrative embodiment. Example manifest for a hybrid mobile banking application deployed on a mobile information flow controller 600 may be, for example, user-approved application manifest 336 deployed on mobile information flow control module 304 in FIG. 3. Example manifest for a hybrid mobile banking application deployed on a mobile information flow controller 600 specifies each requested communication between each code chunk in the set of code chunks within the hybrid mobile application and a respective external entity that a particular code chunk wants to communicate with and also specifies the secure resource that will be shared with the respective external entity.

For example, example manifest for a hybrid mobile banking application 600 lists: chunk name="C1" with inputs of permission name="permission.CAMERA" and data name="credentials" and an output of external entity name="bank.com"; chunk name="C2" with an input of permission name="permission.ACCESS_COARSE_LOCATION" and an output of external entity name="map.com"; and chunk name "C3" with an input of permission name="permission.READ_CONTACTS" and no specified output.

With reference now to FIG. 7, an illustration of a specific example of a user-defined, context-aware policy within a mobile information control module in a mobile device is depicted in accordance with an illustrative embodiment. Example context-aware security policy in a mobile information flow controller 700 may be, for example, one of context-aware security policies 334 in mobile information flow control module 304 in FIG. 3. Example context-aware security policy in a mobile information flow controller 700 defines a particular condition under which permission to access a secure resource of the mobile device is either granted or denied.

For example, example context-aware security policy 700 lists a condition name="worklocation" with a value="geolocation" of specified latitude and longitude coordinates and a permission name="permission.CAMERA" with a condition="worklocation" and a condition match="deny". In other words, example context-aware security policy 700 denies permission to the camera to take images when the current geographic location of the mobile device is at the specified work location coordinates.

Figure 8:
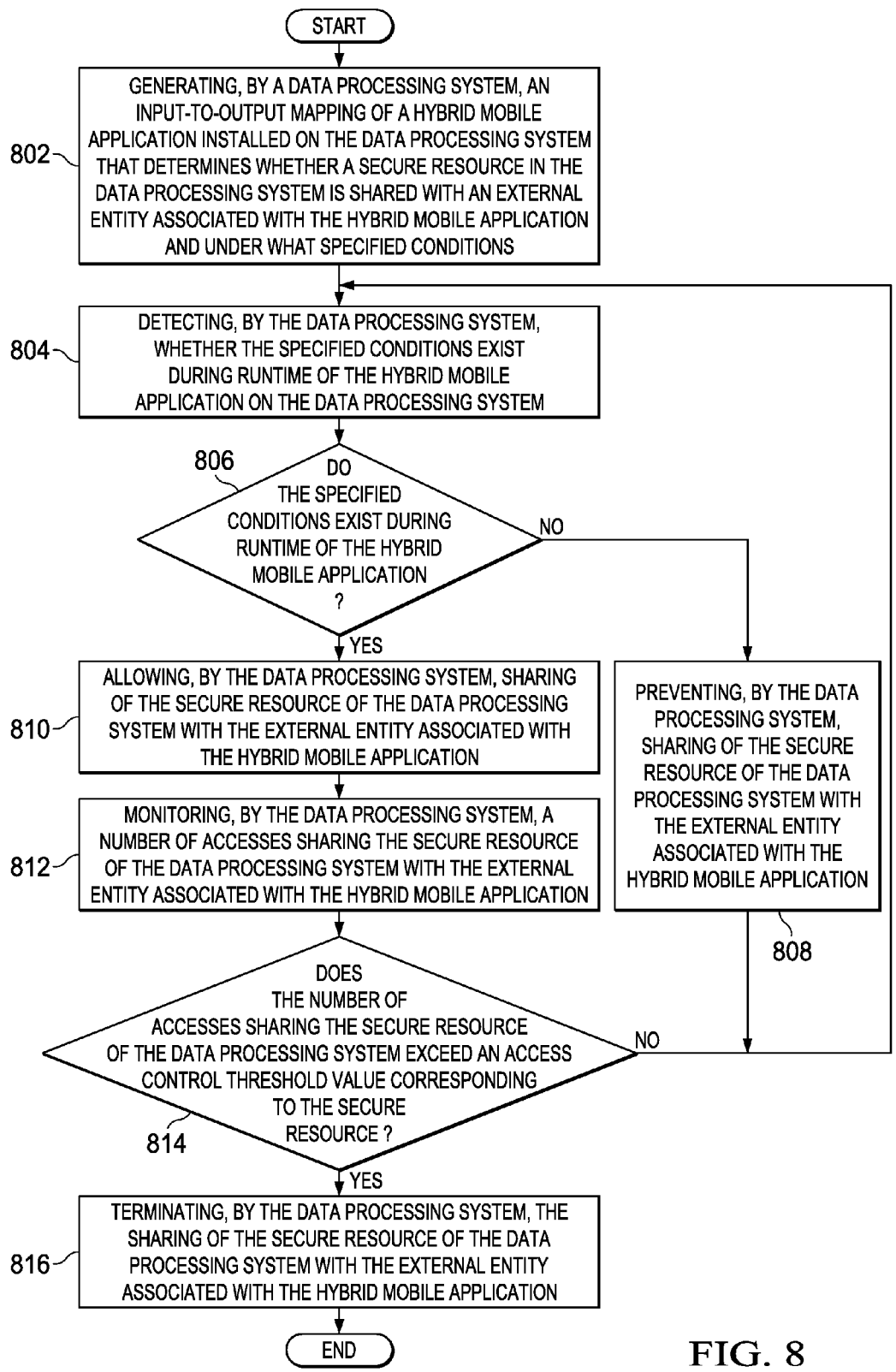
FIG. 8 is a flowchart illustrating a process for controlling access to secure resources of a data processing system in accordance with an illustrative embodiment.

With reference now to FIG. 8, a flowchart illustrating a process for controlling access to secure resources of a data processing system is shown in accordance with an illustrative embodiment. The process shown in FIG. 8 may be implemented in a data processing system, such as, for example, data processing system 200 in FIG. 2.

The process begins when the data processing system generates an input-to-output mapping of a hybrid mobile application installed on the data processing system that determines whether a secure resource in the data processing system is shared with an external entity associated with the hybrid mobile application and under what specified conditions (step 802). The hybrid mobile application installed on the data processing system may be, for example, hybrid mobile application 306 installed on mobile device 300 in FIG. 3. The secure resource in the data processing system that is shared with the external entity associated with the hybrid mobile application may be, for example, a secure resource in secure resources 316 in mobile device 300 that is shared with external entity 326 bank.com and/or external entity 328 map.com in FIG. 3.

The specified conditions may be, for example, at least one of a current geographic location of the data processing system, an identity of the external entity, and an access control threshold value associated with the secure resource. The specified conditions may be listed in, for example, one or more context-aware security policies, such as context-aware security policies 334 in FIG. 3. The current geographic location of the data processing system may be determined using, for example, a geolocation sensor, such as geolocation unit 212 in FIG. 2, in the data processing system. However, it should be noted that the data processing system may utilize any sensor associated with the data processing system to determine whether a specified condition exists or not. The identity of the external entity may be determined using, for example, an internet protocol address, a media access control address, a web address, a universal resource locator, a port number, or any other network identifier. The access control threshold value may be, for example, one of the access control threshold values in access control threshold values 240 in FIG. 2.

Subsequently, the data processing system detects whether the specified conditions exist during runtime of the hybrid mobile application on the data processing system (step 804). Afterward, the data processing system makes a determination as to whether the specified conditions exist during runtime of the hybrid mobile application (step 806). If the data processing system determines that the specified conditions do not exist during runtime of the hybrid mobile application, no output of step 806, then the data processing system prevents sharing of the secure resource of the data processing system with the external entity associated with the hybrid mobile application (step 808). Thereafter, the process returns to step 804 where the data processing system continues to detect whether the specified conditions exist. If the data processing system determines that the specified conditions do exist during runtime of the hybrid mobile application, yes output of step 806, then the data processing system allows sharing of the secure resource of the data processing system with the external entity associated with the hybrid mobile application (step 810).

In addition, the data processing system monitors a number of accesses sharing the secure resource of the data processing system with the external entity associated with the hybrid mobile application (step 812). The data processing system may utilize a monitor, such as secure resource access monitor 238 in FIG. 2, to determine the number of accesses to share secure resources of the data processing system. Further, the data processing system makes a determination as to whether the number of accesses sharing the secure resource of the data processing system exceeded an access control threshold value corresponding to the secure resource (step 814). The access control threshold value may be, for example, one of the access control threshold values in access control threshold values 242 in FIG. 2. If the data processing system determines that the number of accesses sharing the secure resource of the data processing system does not exceed the access control threshold value corresponding to the secure resource, no output of step 814, then the process returns to step 804 where the data processing system continues to detect whether the specified conditions exist during runtime of the hybrid mobile application. If the data processing system determines that the number of accesses sharing the secure resource of the data processing system does exceed the access control threshold value corresponding to the secure resource, yes output of step 814, then the data processing system terminates the sharing of the secure resource of the data processing system with the external entity associated with the hybrid mobile application (step 816). The process terminates thereafter.

Figure 9A:
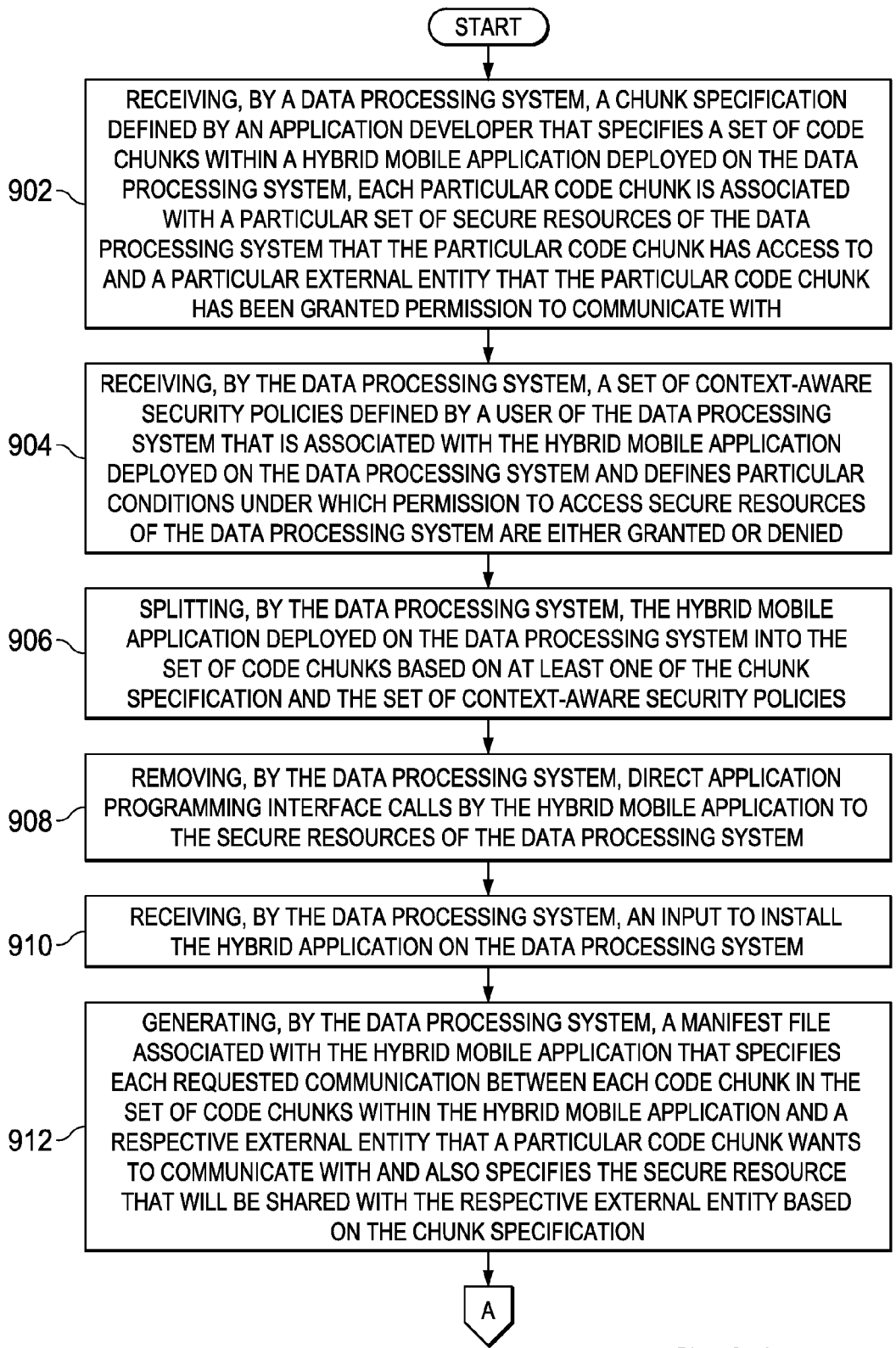
FIG. 9A and FIG. 9B are a flowchart illustrating a process for installing a hybrid mobile application on a data processing system in accordance with an illustrative embodiment.
Figure 9B:
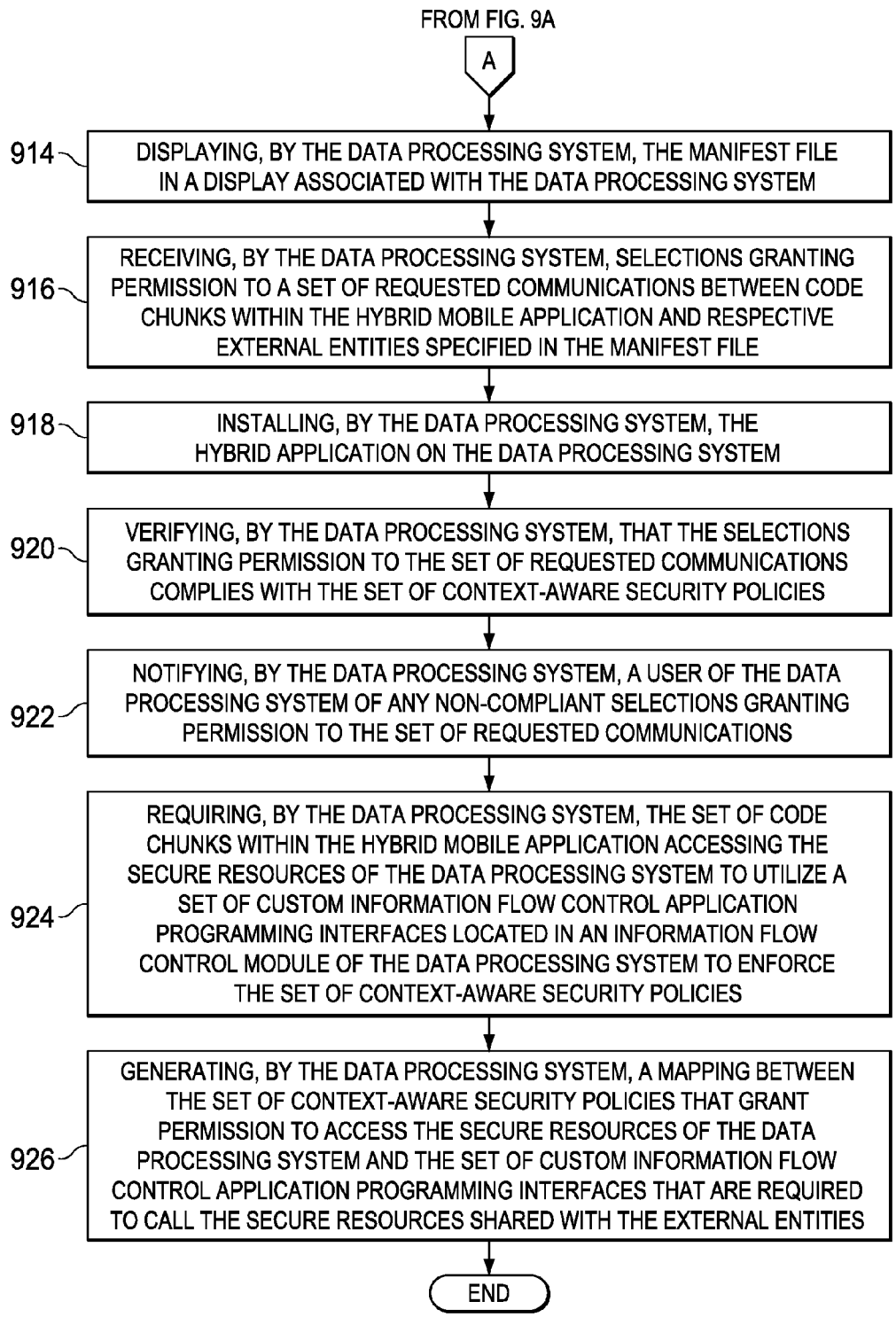

With reference now to FIG. 9A and FIG. 9B, a flowchart illustrating a process for installing a hybrid mobile application on a data processing system is shown in accordance with an illustrative embodiment. The process shown in FIGS. 9A-9B may be implemented in a data processing system, such as, for example, data processing system 200 in FIG. 2.

The process begins when the data processing system receives a chunk specification defined by an application developer. The chunk specification may be, for example, hybrid mobile application chunk specification 410 in FIG. 4. The chunk specification specifies a set of code chunks, such as code chunks 412 in FIG. 4, within a hybrid mobile application deployed on the data processing system. Each particular code chunk is associated with a particular set of one or more secure resources of the data processing system that the particular code chunk has access to and a particular external entity that the particular code chunk has been granted permission to communicate with (step 902). The set of secure resources may be, for example, secure resources 414 in FIG. 4. The granted external entity communication may be, for example, external entity communication 416 in FIG. 4.

In addition, the data processing system receives a set of context-aware security policies defined by a user of the data processing system that is associated with the hybrid mobile application deployed on the data processing system and defines particular conditions under which permission to access secure resources of the data processing system are either granted or denied (step 904). The context-aware security policies may be, for example, context-aware security policies 334 defined by user 332 in FIG. 3. Then, the data processing system splits the hybrid mobile application deployed on the data processing system into the set of code chunks based on at least one of the chunk specification and the set of context-aware security policies (step 906). Further, the data processing system removes direct application programming interface calls by the hybrid mobile application to the secure resources of the data processing system (step 908).

Subsequently, the data processing system receives an input to install the hybrid application on the data processing system (step 910). Afterward, the data processing system generates a manifest file associated with the hybrid mobile application that specifies each requested communication between each code chunk in the set of code chunks within the hybrid mobile application and a respective external entity that a particular code chunk wants to communicate with and also specifies the secure resource that will be shared with the respective external entity based on the chunk specification (step 912). The manifest may be, for example, manifest 420 in FIG. 4. Then, the data processing system displays the manifest file in a display, such as display 218 in FIG. 2, associated with the data processing system (step 914).

Subsequently, the data processing system receives selections granting permission to a set of requested communications between code chunks within the hybrid mobile application and respective external entities specified in the manifest file (step 916). Afterward, the data processing system installs the hybrid application on the data processing system (step 918). Then, the data processing system verifies that the selections granting permission to the set of requested communications complies with the set of context-aware security policies (step 920).

In addition, the data processing system notifies a user of the data processing system of any non-compliant selections granting permission to the set of requested communications (step 922). Furthermore, the data processing system requires the set of code chunks within the hybrid mobile application accessing the secure resources of the data processing system to utilize a set of custom information flow control application programming interfaces located in an information flow control module of the data processing system to enforce the set of context-aware security policies (step 924). The set of custom information flow control application programming interfaces located in the information flow control module may be, for example, custom information flow control application programming interfaces 314 located in mobile information flow control module 304 in FIG. 3. Moreover, the data processing system generates a mapping between the set of context-aware security policies that grant permission to access the secure resources of the data processing system and the set of custom information flow control application programming interfaces that are required to call the secure resources shared with the external entities (step 926). The process terminates thereafter.

Thus, illustrative embodiments provide a method, computer program product, and mobile data processing device for controlling access to secure resources of the mobile device by hybrid mobile applications running on the mobile device based on user-defined, context-aware security policies. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling access to secure resources of a data processing system that includes a processor unit, the method comprising:

removing, by the data processing system, all direct application programming interface calls by an application install on the data processing system to the secure resources of the data processing system;

requiring, by the data processing system, the application accessing the secure resources of the data processing system to utilize a set of custom information flow control application programming interfaces located in an information flow control module of the data processing system to call the secure resources;

generating, by the data processing system, an input-to-output mapping of the application installed on the data processing system that determines whether a secure resource of the secure resources in the data processing system is shared with an external entity associated with the application and under what specified conditions;

determining, by the data processing system, whether the specified conditions exist during runtime of the application;

responsive to the data processing system determining that the specified conditions do not exist during runtime of the application, preventing, by the data processing system, sharing of the secure resource of the data processing system with the external entity associated with the application; and responsive to the data processing system determining that the specified conditions do exist during runtime of the application, allowing, by the data processing system, sharing of the secure resource of the data processing system with the external entity associated with the application.

2. The method of claim 1, further comprising:

monitoring, by the data processing system, a number of accesses sharing the secure resource of the data processing system with the external entity associated with the application;

determining, by the data processing system, whether the number of accesses sharing the secure resource of the data processing system exceeded an access control threshold value corresponding to the secure resource;

responsive to the data processing system determining that the number of accesses sharing the secure resource of the data processing system does not exceed the access control threshold value corresponding to the secure resource, detecting, by the data processing system, whether the specified conditions exist during runtime of the application; and responsive to the data processing system determining that the number of accesses sharing the secure resource of the data processing system does exceed the access control threshold value corresponding to the secure resource, terminating, by the data processing system, the sharing of the secure resource of the data processing system with the external entity associated with the application.

3. The method of claim 1, further comprising:

receiving, by the data processing system, a chunk specification that specifies a set of code chunks within the application, each particular code chunk in the set of code chunks is associated with a particular set of one or more secure resources of the data processing system that the particular code chunk has access to and a particular external entity that the particular code chunk has been granted permission to communicate with;

receiving, by the data processing system, a set of context-aware security policies that is associated with the application and defines particular conditions under which permission to access secure resources of the data processing system are granted; and splitting, by the data processing system, the application into the set of code chunks based on at least one of the chunk specification and the set of context-aware security policies.

4. The method of claim 3, further comprising:

generating, by the data processing system, a manifest file associated with the application that specifies each requested communication between each code chunk in the set of code chunks within the application and a respective external entity that a particular code chunk communicates with and also specifies a particular secure resource that is shared with the respective external entity based on the chunk specification.

5. The method of claim 4, further comprising:

verifying, by the data processing system, that selections in the manifest file granting permission to a set of requested external entity communications complies with the set of context-aware security policies; and displaying, by the data processing system, a notification of non-compliant selections in the manifest file granting permission to the set of requested external entity communications.

6. The method of claim 1, further comprising:

generating, by the data processing system, a mapping between a set of context-aware security policies that grant permission to access the secure resources of the data processing system and the set of custom information flow control application programming interfaces required to call the secure resources.

7. The method of claim 1, wherein the specified conditions include at least one of a current geographic location of the data processing system, an identity of the external entity associated with the application, and an access control threshold value associated with the secure resource.

* * * * *